US010917156B2

United States Patent
Ku et al.

(10) Patent No.: US 10,917,156 B2
(45) Date of Patent: Feb. 9, 2021

(54) METHOD AND APPARATUS FOR FEEDING BACK CQI IN WIRELESS COMMUNICATION SYSTEM

(71) Applicant: LG ELECTRONICS INC., Seoul (KR)

(72) Inventors: Gwanmo Ku, Seoul (KR); Sangrim Lee, Seoul (KR); Hojae Lee, Seoul (KR); Sangwook Han, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/630,424

(22) PCT Filed: Nov. 24, 2017

(86) PCT No.: PCT/KR2017/013477
§ 371 (c)(1),
(2) Date: Jan. 10, 2020

(87) PCT Pub. No.: WO2019/013404
PCT Pub. Date: Jan. 17, 2019

(65) Prior Publication Data
US 2020/0145076 A1 May 7, 2020

Related U.S. Application Data

(60) Provisional application No. 62/531,294, filed on Jul. 11, 2017.

(51) Int. Cl.
*H04B 7/06* (2006.01)

(52) U.S. Cl.
CPC .................. *H04B 7/0632* (2013.01)

(58) Field of Classification Search
CPC .. H04B 7/0639; H04B 7/0417; H04B 7/0632; H04B 7/0452; H04B 17/24; H04B 7/066
(Continued)

(56) References Cited

U.S. PATENT DOCUMENTS

2009/0111475 A1* 4/2009 Yang ..................... H04L 1/0029
455/450
2010/0260234 A1* 10/2010 Thomas ............... H04B 1/7103
375/141
(Continued)

FOREIGN PATENT DOCUMENTS

WO 2008103979 8/2008

OTHER PUBLICATIONS

PCT International Application No. PCT/KR2017/013477, Written Opinion of the International Searching Authority dated Apr. 5, 2018, 22 pages.

*Primary Examiner* — Emmanuel Bayard
(74) *Attorney, Agent, or Firm* — Lee Hong Degerman Kang Waimey

(57) ABSTRACT

A method for feeding back CQI by a terminal in a wireless communication system can be provided according to one embodiment of the present specification. The method may comprise the steps of: receiving, by a terminal, CQI feedback related information from a base station; triggering CQI feedback on the basis of the CQI feedback related information; and feeding back the CQI to the base station, wherein the CQI feedback related information includes information indicating a CQI feedback mechanism type, in which when the CQI feedback mechanism type indicates a first type, an encoding index is generated by a predetermined encoding rule on the basis of a group index of the terminal and the measured CQI index, and the encoding index can be fed back to the base station.

14 Claims, 8 Drawing Sheets

(58) Field of Classification Search
USPC .................................. 375/267, 299, 347, 349
See application file for complete search history.

(56) References Cited

U.S. PATENT DOCUMENTS

| | | | |
|---|---|---|---|
| 2011/0013563 A1* | 1/2011 | Sivanesan | H04B 7/0417 370/328 |
| 2011/0200131 A1 | 8/2011 | Gao et al. | |
| 2012/0320862 A1 | 12/2012 | Ko et al. | |
| 2013/0039349 A1* | 2/2013 | Ebrahimi Tazeh Mahalleh | H04B 7/024 370/336 |
| 2013/0083681 A1* | 4/2013 | Ebrahimi Tazeh Mahalleh | H04L 5/0057 370/252 |
| 2014/0362939 A1* | 12/2014 | Kuo | H04B 7/0634 375/267 |
| 2015/0295693 A1 | 10/2015 | Kwong et al. | |
| 2016/0150567 A1 | 5/2016 | Baker et al. | |
| 2016/0204842 A1* | 7/2016 | Song | H04B 7/0478 375/267 |
| 2018/0123669 A1* | 5/2018 | Xi | H04W 72/121 |
| 2018/0332567 A1* | 11/2018 | John Wilson | H04L 1/0026 |
| 2019/0261380 A1* | 8/2019 | Iyer | H04B 7/0695 |

\* cited by examiner (a)

| Input | 1 | 3 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| UE Group 1 | 1 | 1 | 2 | 2 | 3 | 3 | 4 | 4 | 5 | 5 | 6 | 6 | 7 | 7 | 8 | 8 |
| UE Group 2 | 1 | 2 | 2 | 3 | 3 | 4 | 4 | 5 | 5 | 6 | 6 | 7 | 7 | 8 | 8 | 9 |

(a)

| Input | 1 | 3 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| UE Group 1 | 1 | 1 | 2 | 3 | 3 | 4 | 5 | 5 | 6 | 7 | 7 | 8 | 9 | 9 | 10 | 11 |
| UE Group 2 | 1 | 2 | 2 | 3 | 4 | 4 | 5 | 6 | 6 | 7 | 8 | 8 | 9 | 10 | 10 | 11 |
| UE Group 3 | 1 | 2 | 3 | 3 | 4 | 5 | 5 | 6 | 7 | 7 | 8 | 9 | 9 | 10 | 11 | 11 |

(b)

| Input | 1 | 3 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| UE Group 1 | 1 | 1 | 2 | 3 | 4 | 4 | 5 | 6 | 7 | 7 | 8 | 9 | 10 | 10 | 11 | 12 |
| UE Group 2 | 1 | 2 | 2 | 3 | 4 | 5 | 5 | 6 | 7 | 8 | 8 | 9 | 10 | 11 | 11 | 12 |
| UE Group 3 | 1 | 2 | 3 | 3 | 4 | 5 | 6 | 6 | 7 | 8 | 9 | 9 | 10 | 11 | 12 | 12 |
| UE Group 4 | 1 | 2 | 3 | 4 | 4 | 5 | 6 | 7 | 7 | 8 | 9 | 10 | 10 | 11 | 12 | 13 |

| Input | 1 | 3 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| UE Group 1 | 1 | 1 | 2 | 2 | 3 | 3 | 4 | 4 | 5 | 5 | 6 | 6 | 7 | 7 | 8 | 8 |
| UE Group 2 | 1 | 2 | 2 | 3 | 3 | 4 | 4 | 5 | 5 | 6 | 6 | 7 | 7 | 8 | 8 | 9 |

FIG. 7

| Input | 1 | 3 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| UE Group 1 | 1 | 1 | 2 | 3 | 3 | 4 | 5 | 5 | 6 | 7 | 7 | 8 | 9 | 9 | 10 | 11 |
| UE Group 2 | 1 | 2 | 2 | 3 | 4 | 4 | 5 | 6 | 6 | 7 | 8 | 8 | 9 | 10 | 10 | 11 |
| UE Group 3 | 1 | 2 | 3 | 3 | 4 | 5 | 5 | 6 | 7 | 7 | 8 | 9 | 9 | 10 | 11 | 11 |

FIG. 8

| Input | 1 | 3 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| UE Group 1 | 1 | 1 | 2 | 2 | 3 | 3 | 4 | 4 | 5 | 5 | 6 | 6 | 7 | 7 | 8 | 8 |
| UE Group 2 | 1 | 2 | 2 | 3 | 3 | 4 | 4 | 5 | 5 | 6 | 6 | 7 | 7 | 8 | 8 | 9 |

METHOD AND APPARATUS FOR FEEDING BACK CQI IN WIRELESS COMMUNICATION SYSTEM

CROSS-REFERENCE TO RELATED APPLICATIONS

This application is the National Stage filing under 35 U.S.C. 371 of International Application No. PCT/KR2017/013477, filed on Nov. 24, 2017 which claims the benefit of U.S. Provisional Application No. 62/531,294, filed on Jul. 11, 2017, the contents of which are all hereby incorporated by reference herein in their entireties.

TECHNICAL FIELD

The present disclosure relates to a wireless communication system and, more particularly, to a method and apparatus for feeding back channel quality information (CQI).

BACKGROUND ART

Wireless communication systems have been widely deployed to provide various kinds of communication services such as voice and data services. Generally, these communication systems are multiple access systems capable of supporting communication with multiple users by sharing available system resources (e.g., bandwidth and transmission power). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency-division multiple access (SC-FDMA) system, and a multi-carrier frequency division multiple access (MC-FDMA) system.

Recently, wireless communication systems as new radio access technology (NR) and beyond 5G systems have been used for various usages and technology for efficient use of the systems may be needed.

DETAILED DESCRIPTION OF THE INVENTION

Technical Problems

An object of the present disclosure is to provide a method of feeding back CQI.

Another object of the present disclosure is to provide a method of feeding back CQI in an environment considering NR and beyond 5G.

Another object of the present disclosure is to provide a method of reducing the amount CQI feedback information.

Technical Solutions

According to an embodiment of the present disclosure, provided herein is a method of feeding back channel quality information (CQI) by a user equipment (UE) in a wireless communication system. The method may include receiving CQI feedback related information from a base station (BS) by the UE, triggering CQI feedback based on the CQI feedback related information, and feeding back the CQI to the BS. The CQI feedback related information may include information about a CQI feedback mechanism type and, based on the CQI feedback mechanism of a first type, an encoding index may be generated by a preset encoding rule based on a group index of the UE and a measured CQI index and the encoding index may be fed back to the BS.

According to an embodiment of the present disclosure, provided herein is a user equipment (UE) for feeding back channel quality information (CQI) in a wireless communication system. The UE may include a receiver configured to receive a signal, a transmitter configured to transmit a signal, and a processor configured to control the receiver and the transmitter. The processor may receive CQI feedback related information from a base station (BS) based on the receiver, trigger CQI feedback based on the CQI feedback related information, and feed back the CQI to the BS based on the transmitter. The CQI feedback related information may include information about a CQI feedback mechanism type and, based on the CQI feedback mechanism of a first type, an encoding index may be generated by a preset encoding rule based on a group index of the UE and a measured CQI index and the encoding index may be fed back to the BS.

The following matters may be commonly applied to the method and UE for feeding back CQI in a wireless communication system.

According to an embodiment of the present disclosure, the preset encoding rule may encode the encoding index based on joint coding and, based on restoration of the fed-back encoding index by the BS, CQI ranking information for respective UEs may be acquired based on the encoding index.

According to an embodiment of the present disclosure, the UE may transmit additional CQI related information to the BS and the BS may acquire information about the measured CQI index based on the additional CQI related information and the encoding index.

According to an embodiment of the present disclosure, the CQI feedback related information may further include information about the number of groups.

According to an embodiment of the present disclosure, the CQI may be fed back per subband of the UE and the encoding index may be generated per subband.

According to an embodiment of the present disclosure, based on restoration of the fed-back encoding index by the BS, CQI ranking information per subband may be acquired based on the encoding index.

According to an embodiment of the present disclosure, the CQI feedback related information may further include information about the number of groups and information about the number of subbands.

According to an embodiment of the present disclosure, the CQI may be periodically fed back and the UE may aperiodically feed back additional CQI related information.

According to an embodiment of the present disclosure, the BS may acquire CQI ranking information for respective UEs through the periodically fed-back CQI and acquire information about the measured CQI index through the aperiodically fed-back additional CQI related information.

According to an embodiment of the present disclosure, the CQI feedback related information may further include information about the number of groups, information about the number of subbands, information about the periodically fed-back CQI, and the aperiodically fed-back CQI related information.

Additionally or alternatively, the UE is a part of an autonomous driving device that communications with at least one of a network or another autonomous driving vehicle.

Advantageous Effects

The present disclosure may provide a method of feeding back CQI.

The present disclosure may provide a method of feeding back CQI in an environment considering NR and beyond 5G.

The present disclosure may provide a method of reducing the amount of CQI feedback information.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings:

FIG. 5 is a diagram illustrating an encoding rule applied to the present disclosure based on the number of UE groups;

FIG. 6 is a diagram illustrating an encoding rule applied when the number of UE groups is 2.

FIG. 7 is a diagram illustrating an encoding rule applied when the number of UE groups is 3.

FIG. 8 is a diagram illustrating an encoding rule applied when the number of UE groups is 2.

BEST MODE FOR CARRYING OUT THE INVENTION

Figure 1:
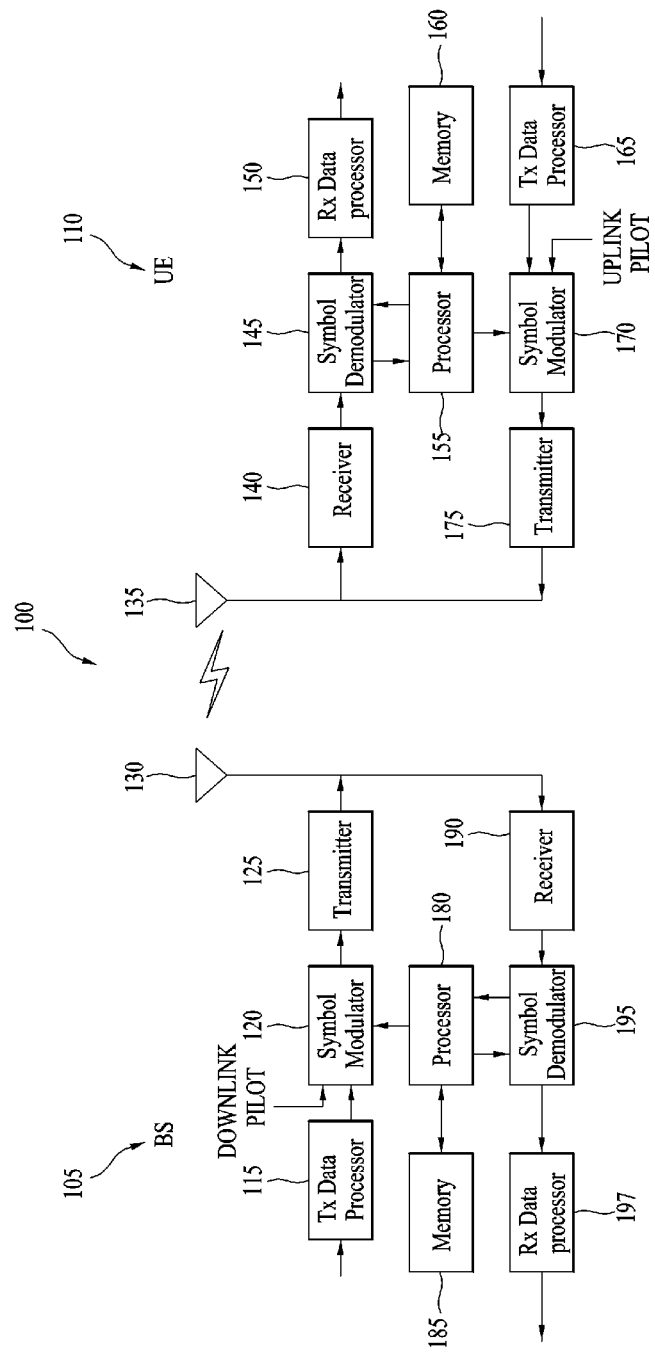
FIG. 1 is a block diagram showing configurations of a base station 105 and a UE 110 in a wireless communication system 100.

Reference will now be made in detail to the preferred embodiments of the present disclosure, examples of which are illustrated in the accompanying drawings. In the following detailed description of the disclosure includes details to help the full understanding of the present disclosure. Yet, it is apparent to those skilled in the art that the present disclosure can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present disclosure from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access), 5G communication system and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA.

The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present disclosure. And, the use of the specific terminology can be modified into another form within the scope of the technical idea of the present disclosure.

Regarding wireless transmission between a BS and a UE, transmission from a BS to a UE is defined as DL transmission, and transmission from a UE to a BS is defined as UL transmission. A mode where radio resources for DL transmission are different from those for UL transmission is referred to as 'duplex mode'. In particular, a mode of performing transmission and reception bidirectionally by dividing time resources into DL transmission time resources and UL transmission time resources is referred to as 'time division duplex (TDD) mode', and a mode of performing transmission and reception bidirectionally by dividing frequency bands into DL transmission bands and UL transmission bands is referred to as 'frequency division duplex (FDD) mode'. It is apparent that the technology proposed in the present disclosure may operate not only in the FDD mode but also in the TDD mode.

FIG. 1 is a block diagram illustrating configurations of a BS 105 and a UE 110 in a wireless communication system 100.

Although one BS 105 and one UE 110 are shown in the drawing to schematically represent the wireless communication system 100, the wireless communication system 100 may include at least one BSn and/or at least one UE.

Referring to FIG. 1, the BS 105 may include a transmission (Tx) data processor 115, a symbol modulator 120, a transmitter 125, a transmitting and receiving antenna 130, a processor 180, a memory 185, a receiver 190, a symbol demodulator 195, and a reception (Rx) data processor 197.

The UE 110 may include a Tx data processor 165, a symbol modulator 170, a transmitter 175, a transmitting and receiving antenna 135, a processor 155, a memory 160, a receiver 140, a symbol demodulator 155, and an Rx data processor 150. Although FIG. 1 shows that the BS 105 uses one transmitting and receiving antenna 130 and the UE 110 uses one transmitting and receiving antenna 135, each of the BS 105 and the UE 110 may include a plurality of antennas. Therefore, each of the BS 105 and the UE 110 according to the present disclosure can support the multi-input multi-output (MIMO) system. In addition, the BS 105 according to the present disclosure can also support both of the single user-MIMO (SU-MIMO) system and the multi-user-MIMO (MU-MIMO) system.

For DL transmission, the Tx data processor 115 receives traffic data, formats the received traffic data, codes the formatted traffic data, interleaves and modulates (or perform symbol mapping on) the coded traffic data, and provides modulated symbols (data symbols). The symbol modulator 120 provides a stream of symbols by receiving and processing the data symbols and pilot symbols.

The symbol modulator 120 performs multiplexing of the data and pilot symbols and transmits the multiplexed symbols to the transmitter 125. In this case, each of the transmitted symbols may be a data symbol, a pilot symbol or a zero value signal. In each symbol period, pilot symbols may be continuously transmitted. In this case, each of the pilot symbols may be a frequency division multiplexing (FDM) symbol, an orthogonal frequency division multiplexing (OFDM) symbol, or a code division multiplexing (CDM) symbol.

The transmitter 125 receives the symbol stream, converts the received symbol stream into one or more analog signals, adjusts the analog signals (e.g., amplification, filtering, frequency upconverting, etc.), and generates a DL signal suitable for transmission on a radio channel. Thereafter, the transmitting antenna 130 transmits the DL signal to the UE.

Hereinafter, the configuration of the UE 110 is described. The receiving antenna 135 receives the DL signal from the BS and forwards the received signal to the receiver 140. The receiver 140 adjusts the received signal (e.g., filtering, amplification, frequency downconversion, etc.) and obtains samples by digitizing the adjusted signal. The symbol demodulator 145 demodulates the received pilot symbols and forwards the demodulated pilot symbols to the processor 155 for channel estimation.

The symbol demodulator 145 receives a frequency response estimation value for DL from the processor 155, performs data demodulation on the received data symbols, obtains data symbol estimation values (i.e., estimation values of transmitted data symbols), and provides the data symbols estimation values to the Rx data processor 150. The Rx data processor 150 reconstructs the transmitted traffic data by demodulating (i.e., performing symbol demapping on), deinterleaving and decoding the data symbol estimated values. The processing performed by the symbol demodulator 145 and the Rx data processor 150 are complementary to that performed by the symbol modulator 120 and the transmission data processor 115 of the BS 105, respectively.

For UL transmission, the Tx data processor 165 of the UE 110 processes the traffic data and provides data symbols. The symbol modulator 170 receives the data symbols, performs multiplexing of the received data symbols, modulates the multiplexed symbols, and provides a stream of symbols to the transmitter 175. The transmitter 175 receives the symbol stream, processes the received stream, and generates an UL signal. The transmitting antenna 135 transmits the generated UL signal to the BS 105.

The BS 105 receives the UL signal from the UE 110 through the receiving antenna 130. The receiver 190 obtains samples by processing the received UL signal. Subsequently, the symbol demodulator 195 processes the samples and provides pilot symbols received in UL and data symbol estimation values. The Rx data processor 197 reconstructs the traffic data transmitted from the UE 110 by processing the data symbol estimation values.

The processor 155 of the UE 110 controls operations (e.g., control, adjustment, management, etc.) of the UE 110, and the processor 180 of the BS 105 controls operations (e.g., control, adjustment, management, etc.) of the BS 105. The processors 155 and 180 may be connected to the memory units 160 and 185 configured to store program codes and data, respectively. Specifically, the memory units 160 and 185, which are connected to the processors 155 and 180, respectively, store operating systems, applications, and general files.

Each of the processors 155 and 180 can be called a controller, a microcontroller, a microprocessor, a microcomputer or the like. In addition, the processors 155 and 180 can be implemented using hardware, firmware, software and/or any combinations thereof.

When the embodiments of the present disclosure are implemented using hardware, the processors 155 and 180 may be provided with application specific integrated circuits (ASICs), digital signal processors (DSPs), digital signal processing devices (DSPDs), programmable logic devices (PLDs), field programmable gate arrays (FPGAs), etc.

Meanwhile, when the embodiments of the present disclosure are implemented using firmware or software, the firmware or software may be configured to include modules, procedures, and/or functions for performing the above-explained functions or operations of the present disclosure. In addition, the firmware or software configured to implement the present disclosure is provided within the processors 155 and 180. Alternatively, the firmware or software may be saved in the memories 160 and 185 and then driven by the processors 155 and 180.

Radio protocol layers between a UE and a BS in a wireless communication system (network) may be classified as Layer 1 (L1), Layer 2 (L2), and Layer 3 (L3) based on three lower layers of the open system interconnection (OSI) model well known in communication systems. A physical layer belongs to the L1 layer and provides an information transfer service via a physical channel. A radio resource control (RRC) layer belongs to the L3 layer and provides control radio resources between a UE and a network. That is, a BS and a UE may exchange RRC messages through RRC layers in a wireless communication network.

In the present specification, since it is apparent that the UE processor 155 and the BS processor 180 are in charge of processing data and signals except transmission, reception, and storage functions, they are not mentioned specifically for convenience of description. In other words, even if the processors 155 and 180 are not mentioned, a series of data processing operations except the transmission, reception, and storage functions can be assumed to be performed by the processors 155 and 180.

Figure 2:
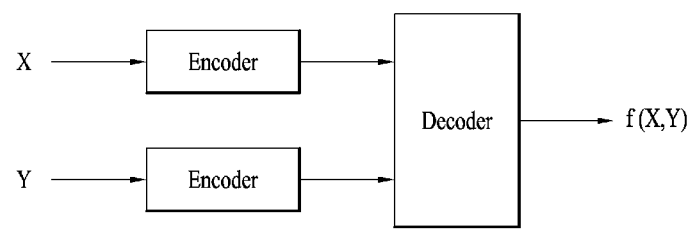
FIG. 2 is a diagram illustrating a distributed functional compression method.
Figure 2:
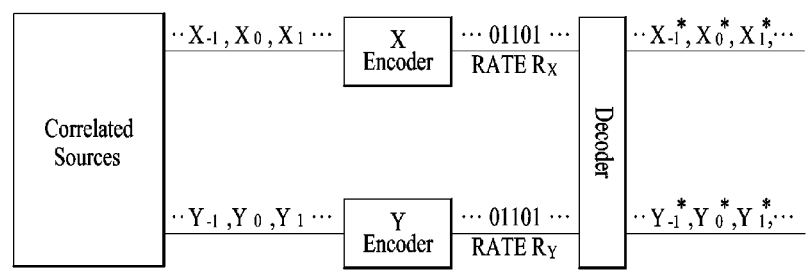

FIG. 2 is a diagram illustrating distributed functional compression. Referring to FIG. 2(a), X and Y may be encoded independently. Decoding may be performed on the assumption of zero distortion and an arbitrarily small probability of error. That is, a decoding function f(X, Y) may be computed with no regard to distortion and a probability error.

Figure 3:
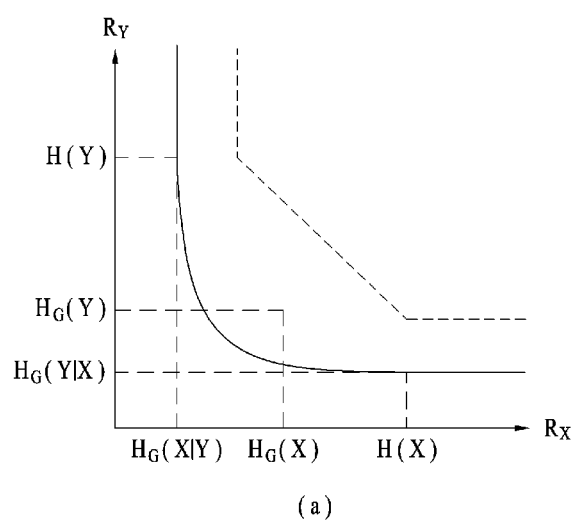
FIG. 3 is a diagram illustrating a rate region, when there is no distortion in distributed functional compression.
Figure 3:
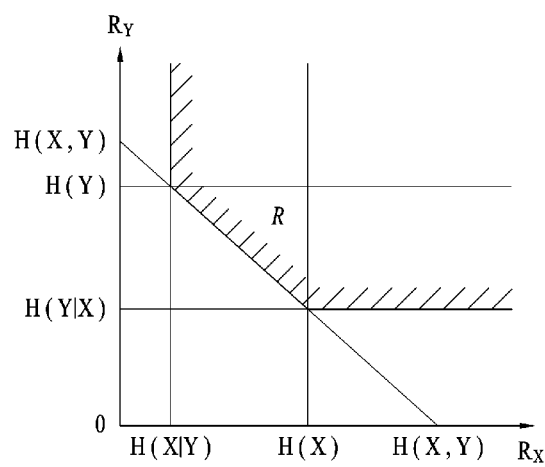

Referring to FIG. 2(b), for example, when distributed function compression is applied, encoders and a decoder for two correlated sources may be configured in a common information source. For example, the correlated information sequences may be . . . and . . . , . . . , respectively. Each of these sequences may be obtained from a separate function p(x, y) with two variables. The encoder of each source may operate without knowledge of an operation of the other source. The decoder may perform decoding on a message stream for each source. Herein, the decoder may determine a minimum number of bits required to accurately reconfigure each information source based on the message stream. FIGS. 3(a) and 3(b) illustrate a rate region when there is no distortion in distributed function compression based on FIGS. 2(a) and 2(b) which have been described above.

A conventional source coding scheme may limit a compression rate in a source encoder based on the Shannon's source coding theorem. When a receiver is to perfectly recover information transmitted by a transmitter, like lossless source coding, the source encoder of the transmitter needs to encode the information at or above at least the entropy rate of the transmitted information.

For example, in addition to point-to-point communication involving one transmitter and one receiver, a communication system including a plurality of transmitters and a single receiver may be considered. Because information transmitted from each transmitter to the single receiver is regarded as an independent source, correlational/mutual information between the sources may be zero. Therefore, a transmission rate may not be reduced despite joint decoding of information related to distributed encoding.

However, when UL transmission involving a plurality of UEs and a single evolved Node B (eNB) is considered, distributed encoding and joint decoding of a function of interest at the eNB may be applied even to independent sources. Thus, only specific information related to the specific function may be transmitted and the transmission rate may be reduced. Herein, the transmission rate may be reduced by the above-described distributed function computation. However, a suitable encoding method for approaching a boundary region may become an issue even to distributed function computation, which will be described below.

For example, when an eNB receives channel information from each UE and performs resource allocation based on the received channel information in mobile communication, the above-described method of reducing a transmission rate may be applied. For example, when an individual UE is located at a cell edge, the method of reducing a transmission rate may also be applied in a coordinated multi-point (CoMP) scenario for interference management between eNBs. More specifically, the method of reducing a transmission rate may be applied, when feedbacks are received from a coordinate eNB and a center eNB and resource allocation is performed based on the feedbacks. An entity responsible for the resource allocation has only to estimate a function value for performing resource allocation as necessary information, rather than recover all of the received feedback information. That is, since transmission of only a specific function value of a resource allocation-related function is sufficient, the transmission rate may be reduced as described before.

For example, the receiver may provide achievable rate distortion information according to a function of interest. However, even though the achievable rate distortion information is known, there is a need for configuring an efficient encoding/decoding method for approaching a boundary region.

Now, a description will be given of an encoding/decoding scheme which is applied when the above-described boundary region is approached, in consideration of a communication system to which a feedback mechanism involving a plurality of transmitters and one receiver is applied.

Figure 4:
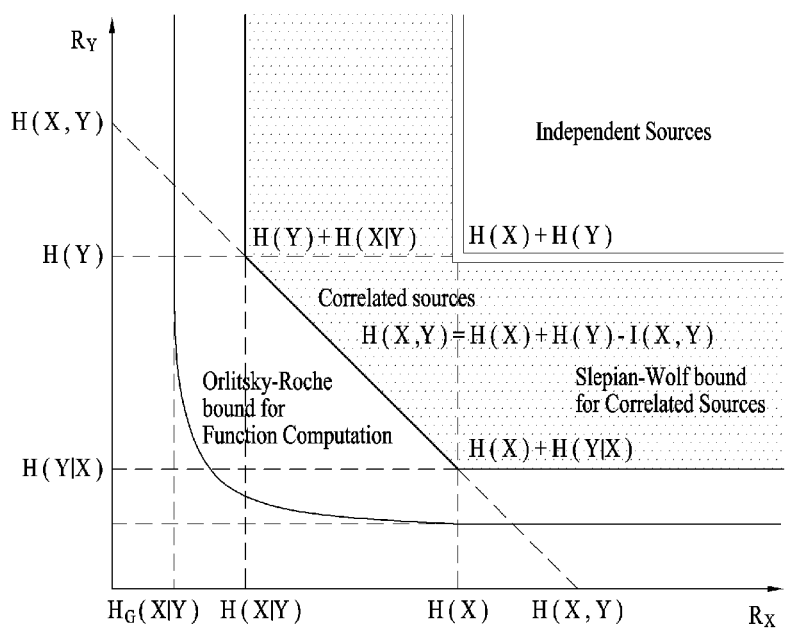
FIG. 4 is a diagram illustrating a rate region based on distributed function computation.

FIG. 4 is a diagram illustrating a rate region based on distributed function computation.

FIG. 4 illustrates a conventional source coding theorem in consideration of the above-described scheme. More specifically, according to the Shannon's source coding theorem, when a transmitter transmits information to a receiver and the receiver recovers the transmitted information, an encoder of the receiver should encode the information at least at the entropy rate of the information and transmit the encoded information to the receiver.

When a plurality of transmitters and a single receiver exist, the lower bound of information transmitted by the transmitters is determined according to the relationship between the information transmitted by the transmitters, as illustrated in FIG. 4. For example, the transmitters may transmit information source X and information source Y to the single receiver, respectively. Referring to FIG. 4, the plurality of transmitters (source X and source Y) should transmit information at least at a joint entropy (H(X, Y)) rate such that the receiver may perfectly recover the information of source X and source Y. For the correlated sources, as much of the transmission information as mutual information (I(X,Y)=H(X)+H(Y)−H(X,Y)≥0) may be saved when the plurality of transmitters (source X and source Y) transmit information at the joint entropy (H(X,Y)) rate, compared to when each encoder transmits information at an entropy rate. That is, the amount of transmitted information may be reduced.

In a legacy communication system, however, because information sources of a plurality of transmitters are regarded as having independent features, I(X, Y)=0 all the time, which means no correlation, and thus the resulting saving of transmitted information may not be considered. That is, when the communication system transmits information of independent sources and the receiver wants to perfectly recover all of the information, the amount of the transmitted information may not be reduced. When independent sources are assumed, the receiver may accurately recover signals transmitted from the plurality of transmitters based on individual encodings and joint decoding.

However, when only a specific function value for information sources is calculated without the need for recovering all of raw data as transmitted data, transmission may be performed based on an Orlitsky-Roch bound, as illustrated in FIG. 4. The Orlitsky-Roch bound may represent the boundary of lossless coding or lossy coding with zero distortion for a given function.

As described above, the amount of reported information may be reduced using the mutual information. In this case, as an example, when UEs report information about legacy DL channel quality to an eNB, a CQI reporting mechanism may be designed for feedback information transmitted by the UEs in consideration of a modulation scheme applied on DL and of spectral efficiency and rate which are performance gains.

Such CQI reporting may be used by the eNB (e.g., Gnb) to allocate a resource to a UE having the best channel in association with a scheduling operation. The CQI reporting may also be mainly used for link adaptation.

However, in NR or beyond 5G, CQI reporting needs to be performed in consideration of high data rate, low latency, and massive multiple UEs. In an example, in a distributed wireless network consisting of a plurality of UEs, ordering/ranking of channel quality between the UEs may be useful information when a CQI feedback mechanism for resource allocation is applied.

In this case, as an example, a modulation scheme ranging from BPSK to 256 QAM has been considered in legacy DL transmission. However, in NR and beyond 5G, a higher modulation scheme may be used.

In an example, reliability required for each of enhanced mobile broad band (eMBB), ultra-reliable, low-latency communication (URLLC), massive machine type communications (mMTC), and vehicle-to-everything communication (V2X), which are new service types as NR and beyond 5G, may differ. In this case, CQI feedback information needs to satisfy requirements necessary for each service.

As an example, eMBB may be a service requiring high-speed rate using broad bandwidth and CQI reporting necessary for high-speed rate may be needed. In an example, URLLC needs to reduce latency for a service provided in real time. In mMTC, CQI reporting needs to be performed with low complexity in consideration of an environment in which multiple UEs are present.

Considering the above-described situations, CQI feedback information required in NR or beyond 5G may increase. This may be generally represented as $L=2^k$ (levels) and k-bit channel quality indices need to be considered.

In this case, if it is necessary to differently set a modulation scheme and transmission rate according to each service, a plurality of CQI reporting level types may be needed.

In an example, a plurality of UEs may require frequent CQI reporting using broad bandwidth. Then, a feedback mechanism for reducing feedback overhead may be needed. In this case, if a CQI feedback mechanism is triggered between a plurality of UEs and one eNB, the respective UEs may independently perform measurement on DL channels and may transmit CQI feedback of K bits per channel regardless of a correlation between the UEs.

In an example, an encoding value in an encoder may be represented as M levels less than $2^k$ due to bit saving according to ambiguity configuration based on a correlation in the CQI feedback mechanism. In this case, the M levels need not be represented in the forms of $2^x$ (an integer, $x \leq k$). In actual transmission, $\log_2 M$ bits may be needed and a joint encoding scheme therefor may be required.

Hereinbelow, a joint encoding scheme for configuring multi-subband CQI reporting by each UE will be described. Particularly, when an environment in which a plurality of UEs is present is considered, since CQI feedback reporting may cause increase in UL overhead due to feedback information, a method of reducing UL overhead may be required. That is, an encoding scheme for achieving feedback overhead minimization may be needed.

As another example, although the CQI feedback mechanism, which is proposed when fine resolution as accurate information is required, has an advantage of bit saving according to ambiguity configuration, additional 1-bit reporting for eliminating ambiguity may be required to restore an original CQI value after acquiring ranking/ordering information.

That is, a CQI reporting procedure considering tradeoff between fine resolution and bit saving may be needed. For example, since resource allocation is not needed in a normal situation in terms of scheduling, feedback overhead of DL CQI reported by UEs may be reduced in consideration of only ordering (or ranking). In this case, when specific resource allocation is needed, the CQI reporting procedure capable of acquiring fine resolution may be needed and needs to be distinguishably configured. Hereinbelow, a method of designing the CQI feedback reporting procedure based on the above description will be proposed.

Hereinbelow, CQI feedback information that should be supported in NR or beyond 5G will be determined and the CQI reporting procedure for the CQI feedback information will be defined. As described above, multiple UEs for one eNB reduce overhead in consideration of a CQI table of $2^k$ levels based on k bits and provide a feedback mechanism capable of distinguishing ordering (or ranking) between the UEs.

For example, as a method of reducing feedback overhead in consideration of the CQI table of $2^k$ levels in multiple UEs, the UEs may transmit the smallest amount of information to the eNB. In this case, bit saving may be achieved by assigning ambiguity. The eNB may restore transmitted CQI values by acquiring relative ordering (or ranking) between the UEs from information received from the UEs and eliminating decoding ambiguity from received values of the UEs obtained by shifting ambiguity parts of the UEs. In this case, decoding is determined by a value received from each UE and, for the same value, priority is given to a UE having a low index based on an encoding rule so that high ranking is assigned to the UE having a low index.

As an example, FIG. 5 represents a plurality of UEs based on a dependent encoding rule.

More specifically, the case in which N UE groups report CQI values consisting of $L=2^k$ levels may be considered. In this case, an encoding rule applied to each UE group based on ranking/ordering may be represented as illustrated in FIG. 5. As an example, assuming that N UE groups ($N \geq 2$) are present, a UE group index is i, and a CQI value measured by an individual UE is j, the encoding rule may be defined by an equation of Table 1 below.

TABLE 1

```
for i=1:N
    for j=1:L
        if (N==2)
            if (InputV(i,j)<i)
                OutputV(i,j)=InputV(i,j);
            elseif ((mod(j-i+1,N)==1)||(mod(j-i+1,N)==0))
                OutputV(i,j)=ceil((j-i+1)/N)*(N-1)-(N-2)+i-1;
            else
                OutputV(i,j)=j-ceil(j/N);
            end
        elseif ((N>2)&&(N<=L))
            if (InputV(i,j)<i)
                OutputV(i,j)=InputV(i,j);
            elseif ((mod(j-i+1,N)==1)||(mod(j-i+1,N)==2))
                OutputV(i,j)=ceil((j-i+1)/N)*(N-1)-(N-2)+i-1;
            else
                OutputV(i,j)=j-ceil((j-i+1)/N);
            end
```

TABLE 1-continued

```
            else
                OutputV(i,j)=0;
            end
        end
end
```

In an example, the encoding rule for a plurality of UEs obtained by the equation of Table 1 may be represented as illustrated in FIG. 5. For example, FIG. 5(a) may represent an encoding rule for N=2 and L=$2^4$=16. As an example, FIG. 5(b) may represent an encoding rule when N=3 and L=$2^4$=16. For example, FIG. 5(c) may represent an encoding rule when N=4 and L=$2^4$=16.

When the feedback mechanism is applied to multiple UE groups and one eNB, an optimal encoder of each UE for minimizing feedback overhead may be generalized as illustrated in FIGS. 5(a), 5(b), and 5(c).

In an example, the eNB may receive the above-described information and then perform decoding based on a decoding rule. In this case, the decoding rule may determine ranking by comparing sizes of received CQI values which are encoded and received from all UEs based on ranking determination. In this case, when the CQI values are equal, a UE group having a low UE group index has priority in ranking. Priority in ranking is given to a UE. That is, the encoding rule also assigns priority to a UE having a low index by comparing UE group indices and is equally applied even to the decoding rule.

Since the eNB is aware of the encoding rule of UEs, the eNB may compare the sizes of CQI values in an ambiguity region of transmission values and may directly perform decoding in the other regions. That is, the eNB may confirm ordering (or ranking) information only with respect to a part based on ambiguity and may require direct decoding in the other parts to obtain information.

As an example, when multi-subband CQI reporting with joint coding is performed based on joint coding, the amount of feedback information may be reduced. In this case, when N UEs consider a CQI table of L=$2^k$ levels based on k bits with respect to one eNB, the UEs may perform feedback by distinguishing ordering (or ranking) between the UEs while reducing overhead.

As described above, when the N UEs and the CQI table of L=$2^k$ levels are given, as the most efficient method of reducing feedback overhead, the UEs may transmit the smallest amount of information to the eNB and the eNB may assign relative ordering (or ranking) for CQI values of the UEs based on information received from the UEs. In this case, since the eNB should restore the CQI values, a CQI reporting mechanism involved in ordering (or ranking) for distinguishing between UE groups the eNB by assigning and shifting ambiguity may be configured as illustrated in FIG. 6.

Referring to FIG. 6, actually transmitted bits per subband are 3 bits [=$\log_2 8$] with respect to UE group 1 and one bit may be saved as compared with input bits. Meanwhile, UE group 2 requires 4 bits [=$\log_2 9$], which are equal to input bits, and bit saving may not be achieved. In this case, as an example, when multiple grouped subbands as X subbands are transmitted, UE group 1 may use 3X bits (=X[$\log_2 8$]) as bits for reporting. UE group 2 may use 2X[$\log_2 3$] bits (=$\log_2 9^X$]) as bits for reporting. That is, when a plurality of grouped subbands is transmitted, bit saving corresponding to 4X−2X[$\log_2 3$] bits may be performed. That is, feedback information may be reduced by applying joint encoding for X subbands, thereby reducing overhead.

More specifically, information about UE groups and a level based on the number of CQI bits as the encoding rule may be determined. In an example, the above information may be information shared between the eNB and the UE. In an example, the above information may be transmitted through a higher layer signal such as an RRC signal or through system information and the present disclosure is not limited to the above-described embodiment. When a CQI feedback mechanism is triggered, the eNB may transmit a system information block (SIB) or control information, including an option value or an indicator indicating the type of the CQI feedback mechanism, to the UE. The SIB or the control information may include a field including information about UE groups and the present disclosure is not limited to the above-described embodiment. In an example, when an option value for the CQI feedback mechanism is a first value, the CQI feedback mechanism may be performed as in a legacy system. Meanwhile, when the option value for the CQI feedback mechanism is a second value, the CQI feedback mechanism based on joint coding may be performed as described above. In an example, the option value may have one bit. The option value may also have bits more than one bit and the present disclosure is not limited to the above-described embodiment. Upon confirming that a CQI feedback mechanism field is included in the SIB or the control information transmitted by the eNB, the UE may trigger the CQI feedback mechanism. In this case, as described above, the CQI feedback mechanism may be differently configured based on the option value.

In this case, when the option value indicates the CQI feedback mechanism based on joint coding described above, each UE may perform measurement based on a DL channel quality index and determine an index corresponding to information to be transmitted. The eNB may receive CQI reporting from UEs and decode ordering (or ranking) and CQI based on the decoding rule as described above.

Hereinbelow, embodiments of a feedback mechanism for bit saving will be described based on the above description.

Embodiment 1

Embodiment 1 may be an embodiment considering the case in which a UE reports 4-bit CQI as 16 levels and there are 3 (N=3) UE groups. However, the above-described numbers may be changed and the present disclosure is not limited thereto. In this case, the encoding rule defined by UE groups and 16 levels may be determined as in FIG. 7. In this case, a mechanism proposed by the eNB may be triggered as the feedback mechanism. For example, when the feedback mechanism is triggered, the eNB may transmit an SIB or control information, including an option value indicating the type of CQI feedback or a field indicating information about the number of groups. As an example, information included in the SIB or the control information may be as indicated in Table 2 below. Although N is assumed to be 3 in Embodiment 1, the present disclosure is not limited thereto. That is, the eNB may provide information about the number of groups to the UE.

TABLE 2

Option = 0(for Normal CQI) or 1(for New CQI with Ordering/Ranking)
N: Number of Group Next, upon confirming that a CQI feedback mechanism field is included in the SIB or control information transmitted by the eNB, the UE may trigger the CQI feedback mechanism.

For example, as described above or as indicated in Table 2, when the option value is a first value ('0'), existing CQI reporting may be triggered. That is, CQI reporting may be performed based on the number of CQI bits without joint coding. On the other hand, when the option value is a second value ('1'), a new feedback mechanism may be triggered. That is, CQI reporting may be performed based on joint coding. In this case, for example, the UE in the new feedback mechanism may determine a group index as indicated in Equation 1 below.

$$i\_g = (UEID \bmod N) + 1 \text{ (UEID: UE ID, e.g., IMSI, C-RNTI)} \quad \text{[Equation 1]}$$

For example, in Embodiment 1 described above, N=3 and a group index may be determined as indicated in Table 3 below based on respective UE IDs. That is, a group index of each UE may be determined according to the total number of groups based on each UE ID.

TABLE 3

| UEID1=14 -> ig1=3 |
| UEID2=13 -> ig2=2 |
| UEID3=15 -> ig3=1 |

Next, when the option value is the second value, namely, when the new feedback mechanism is applied, UEs may perform measurement based on DL channel quality indices and determine indices to be transmitted. In an example, when a CQI index measured by each UE is j and a UE group index is i, each UE may calculate an encoding index as indicated in Table 4 below.

TABLE 4

| If j<i, |
|     j |
| Elseif mod(j−i+1,N) =1 or 2, |
|     ⌈(j−i+1)/N⌉(N−1)−(N−2)+i−1 |
| Else |
|     j−⌈(j−i+1)/N⌉ |

For example, in Table 3 above, UEID1=14(ig1=3), UEID2=13(ig2=2), and UEID3=15 (ig1=1). In this case, the encoding index may be determined based on a measurement value by each UE and this may be as indicated in Table 5 below. That is, encoding values derived as indicated in Table 5 based on respective measurement values and group indices of UEs may be transmitted to the eNB.

TABLE 5

| CQI_1=7 -> 5 |
| CQI_2=6 -> 4 |
| CQI_3=6 -> 4 |

Next, upon receiving CQI reporting from UEs, the eNB may perform decoding based on the decoding rule. In an example, referring to Table 5, the eNB may receive CQI reporting for (5, 4, 4). In this case, the eNB may determine ordering (or ranking) and perform CQI decoding according to the decoding rule.

As an example, in determining ordering (or ranking) based on Table 5 above, UE 1 may have the largest value and UE 2 and UE 3 may have the same value as 4. However, since group indices are ig1=3, ig2=2, and ig3=1, UE 3 having a low index may have priority in ordering (or ranking). Therefore, ordering (or ranking) may be in order of UE 1, UE 3, and UE 2.

As another example, FIG. 7 described above may be used to determine original CQI. In this case, according to the pattern of FIG. 7, UE 1 is encoded by group 3 and a value of 5 may correspond to input 6 or 7. Therefore, CQI1 may be 6 or 7. UE 2 is encoded by group 2 and a value of 4 may correspond to input 5 or 6. Therefore, CQI2 may be 5 or 6. UE 3 is encoded by group 1 and a value of 4 may correspond to input 6. Therefore, CQI3 may be 6.

That is, a level less than L may be transmitted while the CQI feedback mechanism is performed so that overhead may be reduced and ordering (or ranking) information between multiple UEs may be obtained so as to be used for resource allocation. This is as described above.

Embodiment 2

Embodiment 2 may be a feedback mechanism based on joint coding for multiple subbands. For example, Embodiment 2 may be an embodiment indicating a situation applied to reporting on 4-bit CQI (16 levels) and to 2 UE groups. However, Embodiment 2 is only one example and the present disclosure is not limited thereto.

For example, referring to FIG. 8, a feedback mechanism may be triggered according to an encoding rule defined as 16 levels with respect to each UE group. In this case, a mechanism proposed by the eNB may be triggered as the feedback mechanism. As an example, when the feedback mechanism is triggered, the eNB may transmit an SIB or control information, including an option value indicating the type of CQI feedback or a field indicating information about the number of groups. As an example, information included in the SIB or the control information may be as indicated in Table 6 below. Although N is assumed to be 2 in Embodiment 2, the present disclosure is not limited thereto. In Table 6 below, X denotes the number of subbands and is assumed to be 10. However, the present disclosure is not limited thereto.

TABLE 6

| Option = 0 (for Normal CQI) or 1 (for New CQI with Ordering/Ranking) |
| N: Number of Group |
| X: Number of Subbands |

Next, upon confirming that a CQI feedback mechanism field is included in the SIB or the control information transmitted by the eNB, the UE may trigger the CQI feedback mechanism.

As an example, as described above or as indicated in Table 6, when an option value is a first value ('0'), existing CQI reporting may be triggered. That is, CQI reporting may be performed based on the number of CQI bits without joint coding. On the other hand, when the option value is a second value ('1'), a new feedback mechanism may be triggered. That is, CQI reporting may be performed based on joint coding. In this case, for example, the UE in the new feedback mechanism may determine a group index as indicated in Equation 1.

For example, in Embodiment 2 described above, N=2 and group indices may be determined as indicated in Table 7 below based on respective UE IDs. That is, group indices of respective UEs may be determined according to the total number of groups based on the UE IDs.

TABLE 7

UEID1=14 -> ig1=1
UEID2=13 -> ig2=2

Next, when the above option value is the second value, namely, when the new feedback mechanism is applied, UEs may perform measurement based on DL channel quality indices and determine indices to be transmitted. As an example, when a CQI index measured by each UE is j and a UE group index is i, each UE may calculate an encoding index as indicated in Table 8 below.

TABLE 8

If j<i,
  j
Elseif mod(j−i+1,N) =1 or 2,
  ⌈(j−i+1)/N⌉(N−1)−(N−2)+i−1
Else
  j−⌈(j−i+1)/N⌉

For example, in Table 7 above, UEID1=14 (ig1=1) and UEID2=13 (ig2=2). In this case, multiple subbands are present per UE and an encoded value may be configured as indicated in Table 8. As an example, an encoding value per subband may be represented as 3 bits with respect to UE 1 based on FIG. 8. For 10 subbands, 30 bits may be needed.

Herein, for UE 2, based on FIG. 8, an encoding value per subband may be represented as 4 bits and 40 bits may be needed. However, when an encoding value represented as 9^X based on joint coding is converted into a binary value based on a log function and then is transmitted as indicated in Table 9 below, 32 bits may be needed as indicated below. That is, 8 bits may be saved as compared with the case in which an encoding value for each subband is individually transmitted. Next, respective UEs may transmit encoded values to the eNB.

TABLE 9

(CQI1_1, CQI1_2, ..., CQI1_10)=(7, 6, 7, 2, 4, 2, 5, 3, 10, 13)
  → Encoded (4, 3, 4, 1, 2, 1, 3, 2, 5, 7)
  → 30 bits
(CQI2_1, CQI2_2, ..., CQI2_10)=(12, 6, 5, 1, 4, 5, 3, 3, 13, 10)
  → Encoded (7, 4, 3, 1, 3, 3, 2, 2, 7, 6)
  → Nonary value is transmitted by being converted into binary value:
    ⌈20 log$_2$ 3⌉ bits
  → 32 bits Next, if the eNB receives CQI reporting from UEs, the eNB may decode ordering (or ranking) and CQI according to a decoding rule.

In an example, encoding values for respective UEs may be as indicated in Table 9 above. In this case, each UE (or UE group) may determine ranking per subband or best subband original CQI as indicated in Table 10 below. That is, in Table 10, priority for each subband or best CQI may be determined.

TABLE 10

Ranking Determination per Subband:
  UE Group 1: (4, 3, 4, 1, 2, 1, 3, 2, 5, 7)
  UE Group 2: (7, 4, 3, 1, 3, 3, 2, 2, 7, 6)
Best Subband Original CQI Determination:
  UE Group 1: (4, 3, 4, 1, 2, 1, 3, 2, 5, 7)
  UE Group 2: (7, 4, 3, 1, 3, 3, 2, 2, 7, 6)

In an example, UE 1 and UE 2 may additionally perform 1-bit transmission for subbands having the best channel and this is as indicated in Table 11 below. In this case, for example, in FIG. 8, two inputs may correspond to the same encoding value and ambiguity may be solved by one additional bit. In other words, an accurate input value may be known through the one additional bit.

TABLE 11

UE Group 1: ( , , 0, 1, , , 0, 0, , 0)
UE Group 2: (0, 0, , , 0, 1, , , 1, )

In this case, the best CQI obtained by decoding CQI for each subband may be as indicated in Table 12 below.

TABLE 12

| | |
|---|---|
| Subband 1: 12 for UE group 2 | Subband 2: 6 for UE group 2 |
| Subband 3: 7 for UE group 1 | Subband 4: 2 for UE group 1 |
| Subband 5: 4 for UE group 2 | Subband 6: 5 for UE group 2 |
| Subband 7: 5 for UE group 1 | Subband 8: 3 for UE group 1 |
| Subband 9: 13 for UE group 2 | Subband 10: 13 for UE group 1 |

That is, overhead is reduced by transmitting levels less than L through the above-described CQI feedback mechanism and useful information of ordering (or ranking) between multiple UEs is obtained so as to be used for resource allocation.

Embodiment 3

Figure 9:
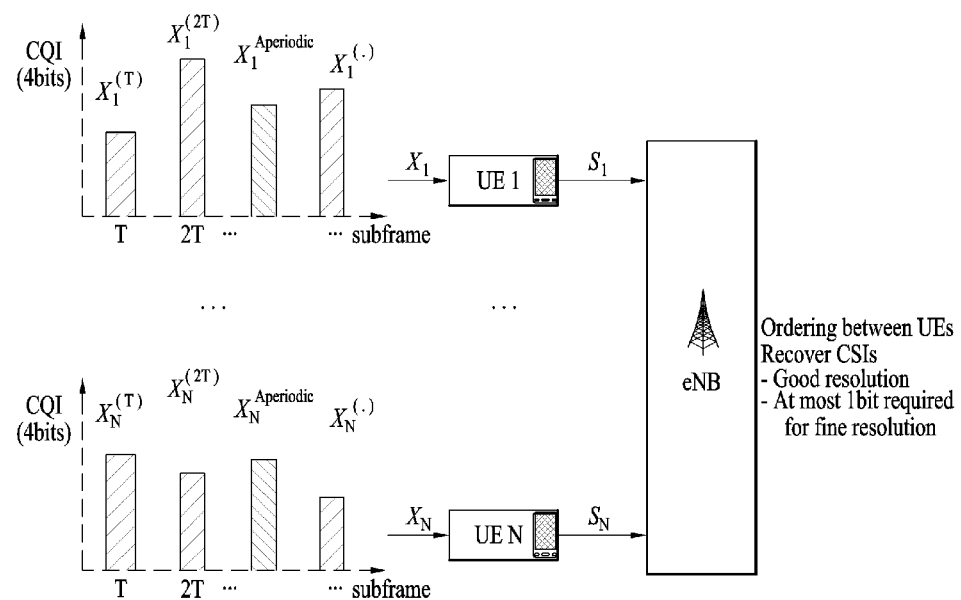
FIG. 9 is a diagram illustrating a method of reporting CQI per subband by each UE.

In Embodiment 3, a CQI reporting procedure considering a tradeoff situation of feedback overhead and resolution is described. In an example, referring to FIG. 9, UEs may perform a periodic CQI reporting mechanism at a predetermined period T. In this case, a scheduler of the eNB may allocate a modulation and coding scheme (MCS) for resource allocation to a selected UE by applying adaptive modulation and coding (AMC). In this case, in an example, CQI needs to be restored to have fine resolution. However, in a situation in which variation in CQI reporting values from individual UEs is small due to a small channel variation, communication performed only by ranking information about multiple UEs may not cause a big issue. That is, communication may be performed only by information as to whether a channel state is changed through the ranking information. On the other hand, in a specific situation in which the eNB desires AMC, a CQI reporting procedure having fine resolution may be necessary. Accordingly, only information about a ranking degree may be obtained through periodic CQI reporting as described above and CQI reporting having fine resolution may be performed through aperiodic CQI reporting. In an example, CQI may determine a period T based on channel statistics. The eNB may set periodic CQI reporting based on the above-described CQI encoding mechanism that provides the ranking information while reducing overhead. In an example, when 2 UE groups are present, the above-described encoding rule used in FIG. 8 may be used for periodic CQI reporting.

In this case, when the eNB desires fine resolution, the eNB may request that a selected UE additionally perform 1-bit reporting or reporting UEs may set 1-bit reporting based on a CQI value in an ambiguity region. A CQI reporting timing for fine resolution may be preset with a new period T_*=nT, integer n≥2. In an example, the CQI reporting timing may be aperiodically set by the eNB. In this case, the UE may additionally report one bit at an adjacent reporting timing. The above-described CQI reporting method may be a hybrid reporting method.

In an example, an encoding rule defined as two UE groups and 16 levels may be determined as described in FIG. 8. In this case, periodic reporting in a hybrid CQI reporting mechanism proposed by the eNB may be equally applied as in FIG. 8 described above.

When the CQI feedback mechanism is triggered, the eNB may transmit an SIB or control information which includes fields indicating an option value indicating the type of the CQI feedback mechanism, a period T, a period T* (optional), and the number of groups (#Group).

In an example, information included in the SIB or the control information may be as indicated in Table 13 below. That is, Table 13 may be similar to Table 2, information about the period T for periodic CQI reporting and the additional period T* for fine resolution may be included in the SIB or the control information. In Embodiment 3, although an embodiment in which N=2 and T*=10 is described, the present disclosure may be differently configured without being limited thereto. As an example, T* may not be included in the SIB or the control information and aperiodic reporting may be performed through triggering by the eNB. The present disclosure is not limited to the above-described embodiment.

TABLE 13

Option = 0 (for Normal CQI) or 1 (for New CQI with Ordering/Ranking)
N: Number of Group
T: CQI Reporting Period Accompanying Ranking
T*: Period Desiring Fine Resolution. This may be Optionally Set.

Upon confirming that the SIB or the control information received from the eNB includes a CQI feedback mechanism field, the UE may trigger a feedback mechanism.

As described above, when the option value is a first value (e.g., '0'), normal CQI reporting may be triggered. That is, CQI reporting which is not based on joint coding may be triggered.

In an example, when the option value is a second value (e.g., '1'), if a new feedback mechanism is triggered, CQI reporting based on joint coding may be performed. In an example, a group index may be changed based on time information (e.g., a subframe number (SFN) or a subframe index) in order to implement fairness between UEs and may be as indicated in Equation 2 below.

$$i\_g = (UEID + TID \bmod N) + 1 \quad \text{[Equation 2]}$$

(UEID: UE ID, e.g., IMSI, C-RNTI, TID 1: SFN, subframe index)

In an example, when two UEs have IDs and group IDs as indicated in Table 14 below, the case in which the above-described TID is applied may be considered. If an SFN is 2, a group index ig may be a value shifted by TID=2. That is, since the TID is changed according to an applied timing, a group of UEs is also changed, so that a problem may be solved by assigning priority to a UE group having a low index. That is, since the TID is changed according to the applied timing, a group of UEs is also changed so that an unfairness situation between UEs may be solved by assigning priority to a UE group having a low index.

TABLE 14

UEID1=14 -> ig1=1
UEID2=13 -> ig2=2

Next, when the above option value is a second value (e.g., '1'), UEs may measure a DL channel quality index received from the eNB and determine an index to be transmitted as indicated in Table 15 below. In this case, when a CQI index measured by each UE is j and a UE group index is i, each UE may determine an encoding index as indicated in Table 15 below which may be the same as Table 8.

TABLE 15

If j<i,
   j
Elseif mod(j−i+1,N) =1 or 2,
   ⌈(j−i+1)/N⌉(N−1)−(N−2)+i−1
Else
   j−⌈(j−i+1)/N⌉

In an example, when UEID1=14 (ig1=1) and UEID2=13 (ig2=2) based on Table 14 described above and measurement values by respective UEs are as indicated in Table 16 below, the UEs may transmit respective encoding values to the eNB. In an example, the encoding values may be periodically transmitted. For example, when a UE receives T_* described above from the eNB, the UE may perform additional CQI reporting for a 10th CQI value. In an example, only a UE selected by the eNB may additionally perform 1-bit reporting. For example, the UE may perform additional 1-bit reporting with respect to the 10th CQI. In FIG. 8, since the 10th CQI is positioned in front of an ambiguity region of 13, a value of '0' may be reported. That is, CQI having fine resolution may be obtained by an additional bit based on the ambiguity region.

As another example, when there is no information about a UE selected by the eNB, additional 1-bit reporting may be performed by all UEs and the present disclosure is not limited to the above-described embodiment.

TABLE 16

(CQI1_1, CQI1_2, ..., CQI1_10)=(7, 6, 7, 2, 4, 2, 5, 3, 10, 13)
  → Encoded (4, 3, 4, 1, 2, 1, 3, 2, 5, 7)
(CQI2_1, CQI2_2, ..., CQI2_10)=(12, 6, 5, 1, 4, 5, 3, 3, 13, 10)
  → Encoded (7, 4, 3, 1, 3, 3, 2, 2, 7, 6)

Next, upon receiving CQI reporting from UEs, the eNB may decode ranking and CQI according to a decoding rule. The above-described decoding rule may be equally applied and decoding may be performed based on an encoding value received in Table 16.

In an example, ranking for each subband may be determined as indicated in Table 17 below, based on Table 16. That is, ordering (or ranking) between UE groups may be recognized in each subband.

TABLE 17

Ranking Determination for each subband: UEg1 (UE group 1), UEg2 (UE group 2)
UEg2, UEg2, UEg1, UEg1, UEg2, UEg2, UEg1, UEg1, UEg2, UEg1

In an example, one additional bit may be included as the case for fine resolution original CQI determination. As an example, the 10th CQI for UE group 1 may represent 13 as a small value of values (13, 14) indicating encoded CQI 7. In addition, the 10th CQI for a UE group 2 may represent 10 as a small value of values (10, 11) indicating encoded CQI 6. Through this, CQI feedback overhead may be reduced. For example, bit saving may be performed as indicated in Table 18 below according to reporting based on a period of 9 and aperiodic CQI reporting based on fine resolution of one time. That is, the number of bits corresponding to about 10 percent relative to a legacy LTE procedure may be reduced.

TABLE 18

| # UEs | LTE Overhead [bits] | Heterogeneous [bits] |
|---|---|---|
| 2 | 80 | 64 |
| 3 | 120 | 105 |
| 4 | 160 | 146 |
| 5 | 200 | 187 |

Figure 10:
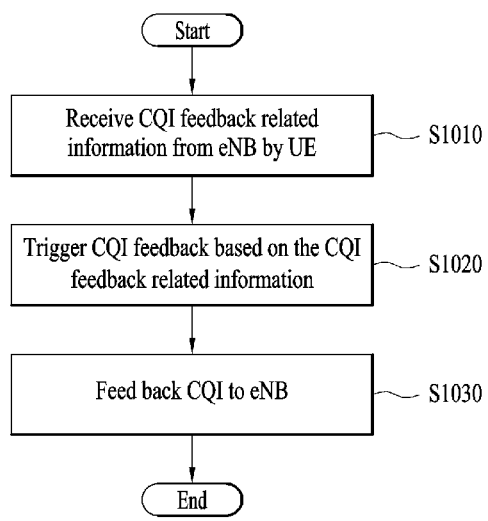
FIG. 10 is a diagram illustrating a method of performing CQI feedback.

FIG. 10 is a diagram illustrating a method of feeding back CQI by a UE.

The UE may receive CQI feedback related information from an eNB (S1010). In this case, as described in FIGS. 1 to 9, the CQI feedback related information may be received from the eNB through an SIB or control information. In an example, the CQI feedback related information may include information about an option value indicating the type of a CQI feedback mechanism. As described above, the option value may indicate an existing CQI feedback mechanism without joint coding or a new type of the CQI feedback mechanism. In addition, the CQI feedback related information may include the number of groups in which UEs may be included, the number of subbands for the UE, or periodic or aperiodic CQI related information, as described above.

Next, the UE may trigger CQI feedback based on the CQI feedback related information (S1020). As described in FIGS. 1 to 9, CQI feedback may be performed based on the CQI feedback mechanism which is determined based on the above-described CQI feedback related information. For example, a new feedback mechanism as the CQI feedback mechanism may be a first type. That is, a mechanism for encoding a group index of a UE and a measured CQI index by a preset index rule based on joint coding and transmitting the encoded index may be the first type. A mechanism using the existing CQI feedback mechanism without using joint coding may be a second type. When CQI feedback is triggered, the UE may encode CQI as described above.

Next, the UE may feed back the CQI to the eNB (S1030). As described in FIGS. 1 to 9, the eNB may restore an encoding index which is fed back based on a decoding rule corresponding to the above-described preset encoding rule. Herein, an ambiguity region may be present with respect to the encoding index as described above and the eNB may be aware of ranking information about CQI of each UE through decoding. That is, although the eNB may not restore CQI having fine resolution, the eNB may be aware of ranking information as necessary information. Then, the number of bits used for feedback may be reduced. In an example, the UE may transmit an additional bit for fine resolution in consideration of ambiguity described above. Then, the eNB may restore CQI having fine resolution. In an example, information about CQI may be periodically transmitted. The additional bit for fine resolution described above may be aperiodically transmitted and this is as described above.

The embodiments of the present disclosure may be implemented through various means. For example, the embodiments may be implemented by hardware, firmware, software, or a combination thereof.

When implemented by hardware, a method according to examples of the present disclosure may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented by firmware or software, a method according to examples of the present disclosure may be embodied as an apparatus, a procedure, or a function that performs the functions or operations described above. Software code may be stored in a memory unit and executed by a processor. The memory unit is located at the interior or exterior of the processor and may transmit and receive data to and from the processor via various known means.

As described above, the detailed description of the preferred examples of the present disclosure has been given to enable those skilled in the art to implement and practice the disclosure. Although the disclosure has been described with reference to exemplary embodiments, those skilled in the art will appreciate that various modifications and variations can be made in the present disclosure without departing from the spirit or scope of the disclosure described in the appended claims. Accordingly, the disclosure should not be limited to the specific examples described herein, but should be accorded the broadest scope consistent with the principles and novel features disclosed herein.

Reference is made herein to both apparatus and method inventions, and the descriptions of both apparatus and method inventions may be complementary to each other.

INDUSTRIAL APPLICABILITY

The present disclosure is applicable to various wireless communication systems including systems conforming to IEEE 802.16x and IEEE 802.11x as well as 3GPP LTE and LTE-A systems.

The invention claimed is:

1. A method of feeding back channel quality information (CQI) by a user equipment (UE) in a wireless communication system, the method comprising:
   receiving, by the UE through a system information block (SIB), CQI feedback related information from a base station (BS),
   wherein the CQI feedback related information includes indication field indicating a type of a CQI feedback mechanism and a number of UE groups;
   triggering CQI feedback based on the type of the CQI feedback mechanism indicated by the indication field; and
   feeding back the CQI to the BS,
   wherein, based on the indication field indicating the CQI feedback mechanism using joint coding, an encoding index is generated based on a group index of the UE and a measured CQI index and the encoding index is fed back to the BS, and
   wherein the group index of the UE is determined based on the number of UE groups and an identification of the UE.

2. The method of claim 1, wherein CQI ranking information for respective UEs is determined based on the encoding index.

3. The method of claim 1, wherein the CQI is fed back per subband of the UE and the encoding index is generated per subband.

4. The method of claim 3, wherein CQI ranking information per subband is determined based on the encoding index.

5. The method of claim 3, wherein the CQI feedback related information further includes information about a number of subbands.

6. The method of claim 1, wherein the CQI is periodically fed back and the UE aperiodically feeds back an additional bit for resolution.

7. The method of claim 6, wherein CQI ranking information for respective UEs is determined through the periodically fed-back CQI and information about the measured CQI index is determined through the aperiodically fed-back additional bit for resolution.

8. A user equipment (UE) for feeding back channel quality information (CQI) in a wireless communication system, the UE comprising:
   a receiver that receives a signal;
   a transmitter that transmits a signal; and
   a processor that controls the receiver and the transmitter, wherein the processor
   receives, through a system information block (SIB), CQI feedback related information from a base station (BS), wherein the CQI feedback related information includes indication field indicating a type of a CQI feedback mechanism and a number of UE groups,
   triggers CQI feedback based on the type of the CQI feedback mechanism indicated by the indication field, and
   feeds back the CQI to the BS,
   wherein based on the indication field indicating the CQI feedback mechanism using joint coding, an encoding index is generated based on a group index of the UE and a measured CQI index and the encoding index is fed back to the BS, and
   wherein the group index of the UE is determined based on the number of UE groups and an identification of the UE.

9. The UE of claim 8, wherein CQI ranking information for respective UEs is determined based on the encoding index.

10. The UE of claim 8, wherein the CQI is fed back per subband of the UE and the encoding index is generated per subband.

11. The UE of claim 10, wherein CQI ranking information per subband is determined based on the encoding index.

12. The UE of claim 10, wherein the CQI feedback related information further includes information about a number of subbands.

13. The UE of claim 8, wherein the CQI is periodically fed back and the UE aperiodically feeds back an additional bit for resolution.

14. The UE of claim 13, wherein CQI ranking information for respective UEs is determined through the periodically fed-back CQI and information about the measured CQI index is determined through the aperiodically fed-back additional bit for resolution.

* * * * *